United States Patent [19]

Sorathia et al.

[11] Patent Number: 5,284,697

[45] Date of Patent: Feb. 8, 1994

[54] COMPOSITE STRUCTURES HAVING ORGANIC MATRICES AND DUPLEX ZINC/CERAMIC FIRE BARRIERS

[75] Inventors: Usman A. Sorathia; Roger M. Crane, both of Arnold, Md.

[73] Assignee: The United States of America as represented by the Secretary of the Navy, Washington, D.C.

[21] Appl. No.: 929,212

[22] Filed: Aug. 13, 1992

[51] Int. Cl.⁵ .............................................. B32B 27/38
[52] U.S. Cl. .................................... 428/213; 428/413; 428/335; 428/418; 428/480; 428/458; 428/463; 428/469; 428/472; 428/435; 428/689; 428/697; 428/699; 428/702; 428/920; 428/921
[58] Field of Search ............... 428/458, 463, 469, 472, 428/335, 430, 435, 442, 688, 689, 697, 699, 702, 920, 921, 213, 413, 418, 480

[56] References Cited

U.S. PATENT DOCUMENTS

| | | |
|---|---|---|
| 3,715,265 | 2/1973 | Allen .................................. 428/920 |
| 3,799,056 | 3/1974 | Colignon ............................. 428/920 |
| 4,428,999 | 1/1984 | George ............................... 428/920 |
| 4,460,529 | 7/1984 | Schultze ............................. 264/81 |
| 4,581,285 | 4/1986 | Mahefky ............................. 428/920 |
| 4,647,500 | 3/1987 | George .............................. 428/313.9 |
| 4,910,074 | 3/1990 | Fukawa .............................. 428/920 |
| 4,916,003 | 4/1990 | Le Sech ............................. 428/920 |

*Primary Examiner*—A. A. Turner
*Assistant Examiner*—Timothy M. Speer
*Attorney, Agent, or Firm*—Charles D. Miller

[57] ABSTRACT

A process is described for forming a duplex coating as a fire barrier on a composite structure comprising organic matrices so that the structure shows reduced flammability, less smoke, higher ignition resistance, and more residual flexural strength after exposure to fire. A thin layer of a metal such as zinc is arc wire sprayed onto a surface of the structure to form a bonding and heat-diffusing coating, and a stabilized zirconia coating is then plasma sprayed onto the metal coating to form a thermal barrier coating.

2 Claims, 5 Drawing Sheets

COMPOSITE STRUCTURES HAVING ORGANIC MATRICES AND DUPLEX ZINC/CERAMIC FIRE BARRIERS

BACKGROUND OF THE INVENTION

1. Field of the Invention

This invention relates to protecting organic-matrix based composite materials from damage by fire and consequent release of noxious gases and smoke. It especially relates to adding an inorganic surface coating that delays the heat-up rate and reduces the overall temperature on the back side of a composite structure.

2. Review of the Prior Art

Aerospace use of composites relies heavily on epoxy resins for providing optimum mechanical properties at much reduced weight. Marine applications of composites have continued to depend on polyester matrices as dictated by size, cost, and the ability to tailor-cure parameters, particularly gel times and exotherm rates. As requirements for reduced weight, better fire and smoke properties, and mechanical properties increase for a number of potential ship applications,(such as masts, sonar domes, deckhouses, and minesweeper hulls), new or modified resins are needed that exhibit superior properties over those currently used.

Composite structures are potentially very useful for improving specific structural characteristics of Naval ships and submarines while reducing weight, but the combustible nature of the polymeric components of such structures has limited the usage of these materials because the conventional polyester and epoxy types currently used in shipboard applications and the epoxy types used in aerospace applications will support combustion and evolve large quantities of smoke while burning.

The minimum thickness of a suitable composite structure for such applications is ⅛ inch. Addition of a thin thermal barrier that could block incoming radiation, so that heating must occur primarily by conduction rather than radiation, could delay the heat-up rate and reduce the overall temperature on the back side of the structure, thereby increasing fire resistance and reducing evolution of smoke and noxious gases.

Because of high temperatures and impact velocity, however, ceramic coatings cannot be sprayed directly onto engineering plastics without substrate degradation, such as warping of the plastic structure, charring and/or melting of its surface, or peeling of the coating.

A commercial aircraft application has demonstrated a ceramic/graphite hybrid composite firewall which, when installed in a Lear Fan 2100 aircraft, must contain a 2000° F. fire and provide 15 minutes of protection to airframe components, as described by Fell et al in "The First All Composite Firewall as Developed and Designed for the Lear Fan 2100", 28th National SAMPE Symposium, Apr. 12-14, 1983.

U.S. Pat. No. 4,460,529 discloses a quasi-isothermal process for manufacturing ceramic or ceramic oxide hollow bodies without use of a binder, an adhering substrate, or internal embedded supports by spraying hot atomized ceramic or ceramic oxide particles as a plasma onto a non-adhering, highly thermally conductive, internally cooled mold core which is mounted on a rotating lathe which in turn is mounted on a longitudinally movable carriage. After removal from the mold core, the hollow body is capable of being directly used without sintering.

SUMMARY OF THE INVENTION

It is accordingly an object of this invention to provide a process for applying ceramic coatings to composite structures containing organic matrices without damage to the structures or peeling of the coatings.

It is also an object to provide composite structures containing organic matrices and having ceramic coatings thereon as a fire barrier that inhibits heat transfer to the substrate.

It is further an object to provide a bonding and heat-diffusing coating between the surface of a composite structure and the overlying ceramic coating.

In accordance with these objects and the principles of this invention, a process is provided for applying a fire barrier, in the form of a duplex coating of a thin metal layer and a thin ceramic layer, to a composite structure having organic matrices. This process is surprisingly accomplished without degradation of the organic matrices. The process comprises:

A. arc wire spraying a metal as a bonding and heat-diffusing coating onto a composite structure; and
B. plasma spraying a stabilized zirconia as a thermal barrier coating onto the metal coating.

The bonding and heat-diffusing coating is 0.001–0.003 inch thick. Any metal or metal alloy having a melting point within the range of 450°–1250° F. is useful for forming the bonding and heat-diffusing coating, but zinc is preferred.

The zirconia coating is 0.005–0.007 inch thick. The preferred phase stabilizer is yttrium oxide, $Y_2O_3$, but MgO and CaO are satisfactory. Evaluation of the duplex coating, when applied to a composite panel made with glass/vinyl ester, showed an average bond strength of 1833 psi.

The bonding and heat-diffusing coating conducts heat away from "hot spots" and thereby minimizes localized degradation of the plastic substrate, in addition to providing strong bonding to the composite structure for the stabilized zirconia coating.

Without any fire barrier treatment, all composite structures failed to meet the ignitability and average heat release requirements at 300 seconds of the U.S. Navy when subjected to a radiant heat flux of 100 $kW/m^2$. With the duplex coating, all composite structures except for the glass/vinyl ester composite structure met these requirements.

In general, the duplex coating of this invention delayed the onset of ignition and reduced smoke generation but, except for the graphite/epoxy and graphite/phenolic composite structures, did little to reduce the evolution of CO and $CO_2$.

DESCRIPTION OF THE PREFERRED EMBODIMENTS

Four composite structures were made in the form of panels with selected organic matrices and were tested alone (C) and with a ceramic coating (C/B) for flame spread according to ASTM E-162, for heat release and ignitability according to ASTM E-1354, and for smoke and toxic gas generation according to ASTM E-662. These structures were glass/vinyl ester, graphite/epoxy, graphite/bismaleimide, and graphite/phenolic. Residual flexural strength according to ASTM D-790 was also measured.

Glass/Vinyl Ester (Gl/VE)

Vinyl ester resins are the reaction products of epoxy resins with ethylenically unsaturated carboxylic acids. The vinyl ester used was non-fire retardant. The composite was fabricated by hand lay up using cobalt naphthenate and dimethyl aniline as promoters and methyl ethyl ketone peroxide as a catalyst. It was cured at room temperature. The reinforcement used was E glass 24 oz./sq.yd. woven roving. The panel thickness was 0.175 inch.

Graphite/Epoxy (Gr/EP)

Epoxy resins are characterized by epoxide groups (oxirane rings). Tetrafunctional epoxy resin based on diglycidyl ether of bisphenol A was used in this study. The material was obtained in the form of unidirectional prepreg tape, 12 inches wide. The composite was fabricated with 36 plys in a (0/90)s stacking sequence and cured at 350° F. in an autoclave with a final thickness of 0.175 inch.

Graphite/Bismaleimide (Gr/BMI)

Bismaleimides belong to the addition type reaction in the polyimide family of high temperature matrix resins. The imide oligomers or bisimide monomers are generally derived from maleic anhydride and aromatic diamines. A commercially available bismaleimide system was used in the form of a unidirectional prepreg tape. This bismaleimide system cures via a free radical mechanism resulting in a crosslinked thermoset system with no condensation by-products.

The composite was fabricated with 34 plys in a (0/90)s stacking sequence and cured at 350° F. in an autoclave with final thickness of 0.175 inch. The test panels were post cured for four hours at 475° F. in a convection oven.

Graphite/Phenolic (Gr/PH)

Phenolic resins are the reaction products of one or more of the phenols with one or more of the aldehydes. Phenolic resins have the inherent characteristics of low flammability and little smoke. A commercially available heat resistant phenolic resin system was used in this study in the form of a fabric prepreg, 42 inches wide.

The composite was cured at 350° F. in an autoclave with a final thickness of 0.175 inch. Test panels were post cured for 2 hours at 250° F., 2 hours at 300° F., 2 hours at 350° F., and 1 hour at 400° F. in a convection oven.

Description of Process for Forming a Duplex Fire Barrier

Duplex zinc/ceramic spraying of composite test panels was done under contract with MSNW, Inc., P.O. Box 865, San Marcos, Cal. 92069. The process sequence comprised: solvent wiping of the panel surface, grit blasting of this surface with 20 mesh $Al_2O_3$ at 30 psi, arc wire spraying the Zn bond coat onto the blasted surface, and plasma spraying the $ZrO_2$-$Y_2O_3$ thermal barrier coat onto the zinc coat while air cooling the spraying with four air jets. All spraying was done on automatic X-Y traverse for process control.

The arc wire spraying of zinc was done with a Metco 10E gun, using 0.125 inch diameter zinc wire at a wire feed rate of 45 pounds per hour and at an air cap size of EC and gears setting at high. Pressure settings were: 32 for oxygen, 15 for acetylene, and 65 for air. Flowmeter settings were: 45 for oxygen, 42 for acetylene, and 53 for air. The zinc coating was 0.001–0.003 inch in thickness.

The plasma spraying of $ZrO_2$-8%$Y_2O_3$ was done with a Plasmadyne SG-1B gun, Plasmadyne S1-3-R cathode, and Plasmadyne S1-3-F anode, Plasmadyne S1-22 arc gas fitting, and powder injection. Open circuit voltage was 80. Both arc gas and powder gas were argon at 50 psig. Arc gas flow was set at 60, powder gas flow was set at 15, the hopper setting was A/80, and the spray distance was 4 inches, using 38 volts and 625 amps. The sprayed thickness of this ceramic coating of yttria-stabilized zirconia was 0.005–0.007 inch.

Flame-Spread Index (ASTM E-162)

Flame spread has been defined as the progress of flame over a surface and is used to describe the response of materials to heat and flame under controlled laboratory conditions. The rate at which flame will travel along surfaces depends upon the physical and thermal properties of the material, its method of mounting and orientation, type and level of fire or heat exposure, the availability of air, and properties of the surrounding enclosure.

ASTM E-162 is the standard radiant panel test procedure for surface flammability. The threat consideration tested in the flame spread test is that a fire will be controllable for 300 seconds, thereby providing time for active extinguishment efforts. A controllable fire is considered to be a fire that can be extinguished without a requirement to ventilate externally.

This method uses an inclined 6×18-inch panel in front of which a radiant heat source is placed, consisting of a gas-fired radiant panel maintained at 670° C. (1238° F.). A pilot flame, located at the upper edge of the test specimen, ignites the specimen. Progress of the flame front down the surface of the specimen is used to determine the flame spread factor. Temperature rise measurements in the stack above the sample are used to determine the heat evolution. Test duration is 15 minutes. The flame spread index is determined from flame spread factor and heat evolution. Materials having the lowest flame spread index have the greatest resistance to burning.

The test results are given in Table 1 for all four composite panels without protection and for two of the panels having the fire barrier. It is apparent that the ceramic coating provided significant resistance to surface burning.

Smoke and Toxic Gas Generation (ASTM E-662)

Smoke is defined as the visible, non-luminous, airborne suspension of particles originating from a combustion process. Smoke affects visibility and hinders the abilities of occupants to escape the fire and of fire fighters to locate and suppress it. Smoke density is influenced by the degree of ventilation.

Toxic gas generation is defined as the poisonous and destructive gases evolved from materials during the process of combustion, incomplete or complete, that interfere with body tissues, organs, and functions, resulting in incapacitation and death. The most commonly encountered toxic gas is carbon monoxide which is believed to cause 75% of all fire deaths in buildings. Other combustion byproducts such as hydrogen chloride and hydrogen cyanide may or may not superimpose their toxicity on that of carbon monoxide.

ASTM E-662 is the standard test method for Specific Optical Density of smoke generated by solid materials. Measurement is made of the attenuation of a light beam by smoke accumulating within a closed chamber due to non-flaming pyrolytic decomposition and flaming combustion. As the sample is heated by a radiant flux of 25 $kW/m^2$, either in non-flaming or flaming mode, the amount of light transmitted as a fraction of initial light is used to calculate the specific optical density, optical density begin the single measurement most characteristic with regard to visual obstruction.

TABLE 1

| Flame Spread Index (ASTM E-162) | | | | |
|---|---|---|---|---|
| Composite/Fire Barrier | Gl/VE (A) | Gr/EP (B) | Gr/BMI (C) | Gr/PH (D) |
| Control | 156 | 20 | 12 | 6 |
| Ceramic Coating | 5 | 1 | — | — |

Table 2 gives maximum smoke density (Dm), smoke obscuration at 300 seconds (Ds 300s), time to reach smoke obscuration of 100 in minutes, and amounts of four toxic gases evolved from the test panels. Evolution of four combustion gas products is also shown in Table 2 for all of the four tested composites. The glass/vinyl ester composite is clearly the worst offender, particularly as to carbon monoxide, and is not helped by the ceramic fire barrier according to this test. The graphite/epoxy and the graphite/phenolic composites are significantly improved, however. It is apparent that the ceramic coatings made marked improvement in smoke obscuration at 300 seconds, and some improvement in time to reach smoke obscuration of 100.

Figure 1:
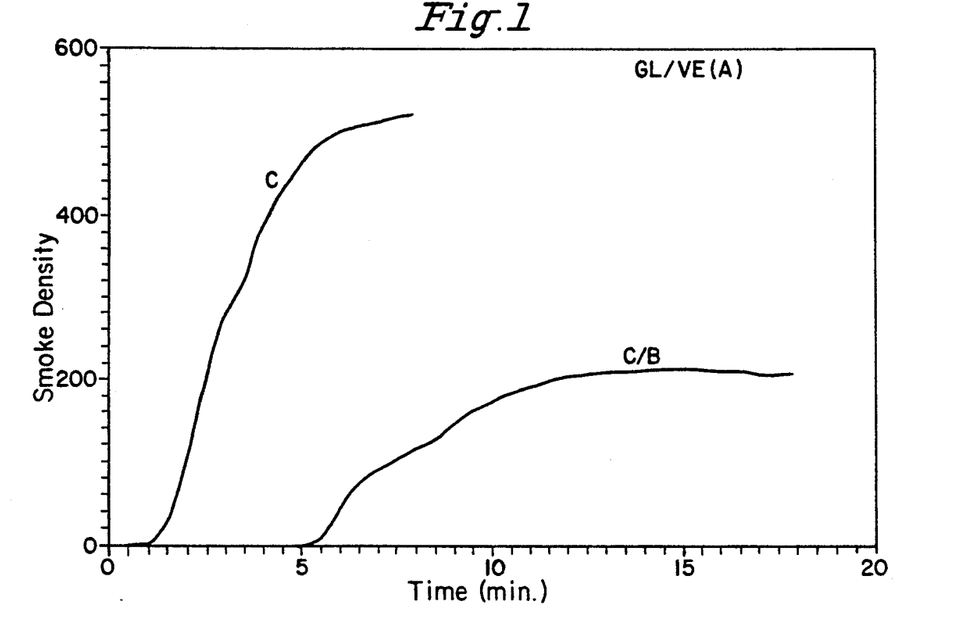
FIG. 1 is a graph of the increase of smoke density against elapsed time for a glass/vinyl ester composite structure (Gl/VE), alone (C) and with a ceramic coating (C/B).
Figure 2:
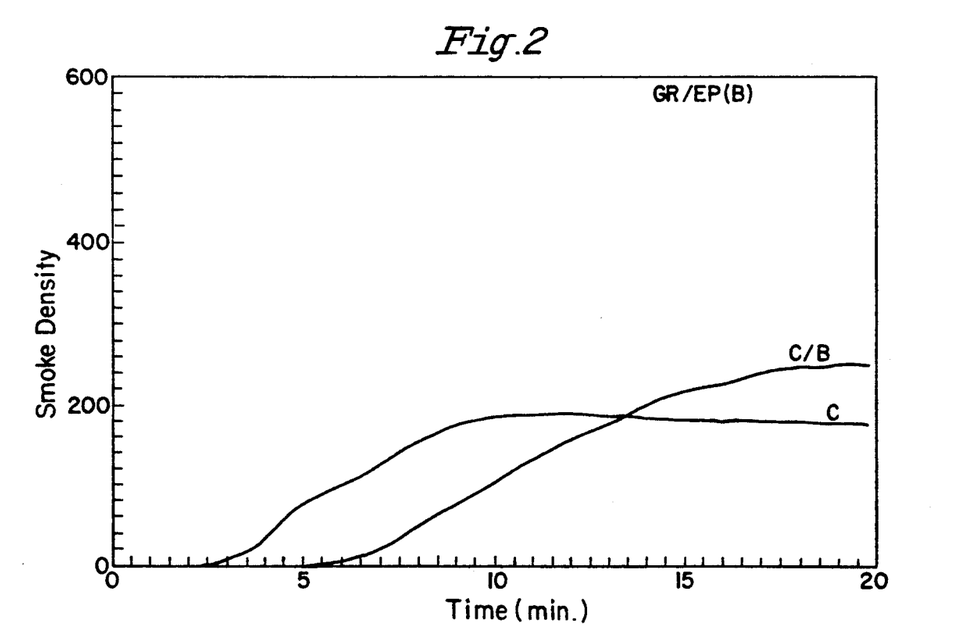
FIG. 2 is a graph of smoke density against elapsed time for a graphite/epoxy composite structure (Gr/Ep), alone (C) and with a ceramic coating (C/B).
Figure 3:
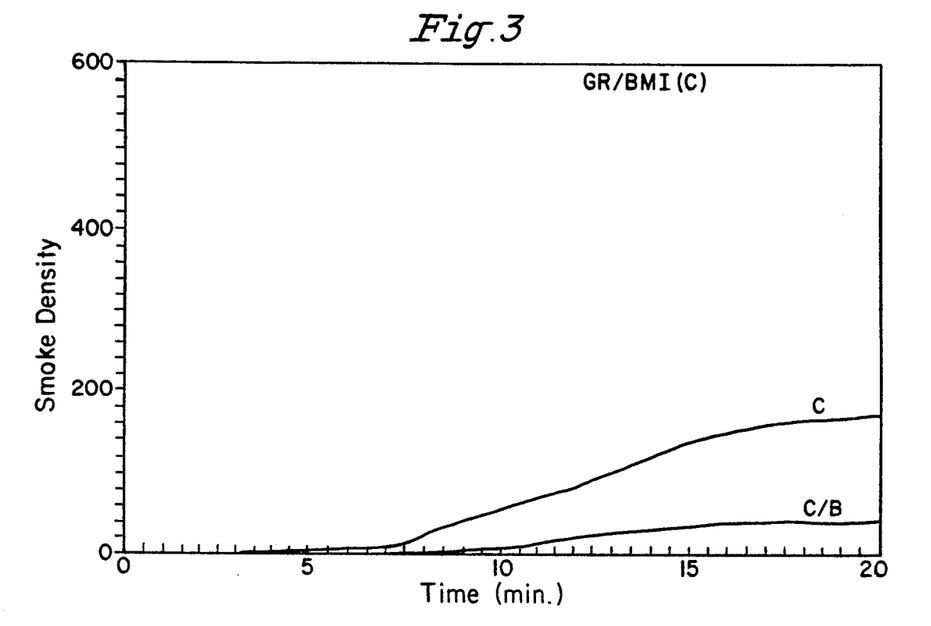
FIG. 3 is a graph of smoke density against elapsed time for a graphite/bismaleimide composite structure (Gr/BMI), alone (C) and with a ceramic coating (C/B).
Figure 4:
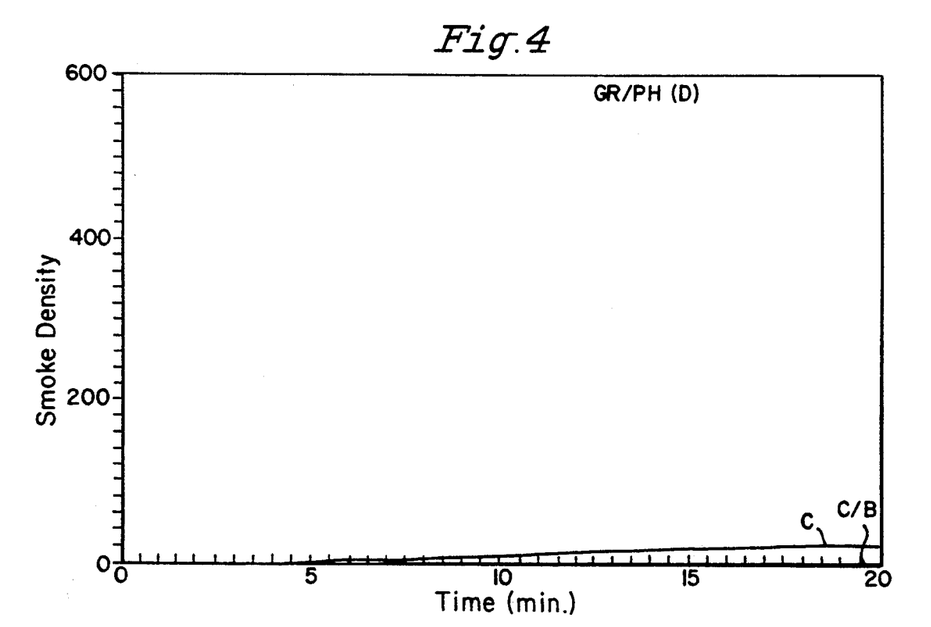
FIG. 4 is a graph of smoke density against elapsed time for a graphite/phenolic composite structure (Gr/Ph), alone (C) and with a ceramic coating (C/B).

With reference to FIGS. 1-4, it is clear that the glass/vinyl ester composite (A) is most susceptible to smoke generation and that the graphite/phenolic composite (D) is least susceptible. All are improved, however, by the duplex fire barrier of this invention.

Residual Flexural Strength (ASTM D-790)

Flexural strength was selected to characterize residual mechanical integrity of composite panels after fire exposure. As part of the testing protocol, all specimens were exposed to a radiant heat source of 25 $kW/m^2$ for a duration of 20 minutes in a flaming mode during the ASTM E-662 test procedure.

TABLE 2

| Smoke Generation (ASTM E-662) and Gas Evolution, GL/VE(A). | | | | | | | |
|---|---|---|---|---|---|---|---|
| Composite | Dm | Ds (300s) | t100 | CO | $CO_2$ | HCN | HCL |
| Gl/Vinyl Ester | 576 | 463 | 2 | 230 | 0.3 | ND* | ND |
| Ceramic Coating | 214 | 2 | 8 | 300 | 1.0 | 1 | 0.5 |
| Gr/Epoxy | 191 | 75 | 6 | 115 | 0.9 | 15 | tr+ |
| Ceramic Coating | 249 | 2 | 10 | 80 | 0.6 | 2 | 2 |
| Gr/BMI | 171 | 6 | 13 | 175 | 0.8 | 3 | ND |
| Ceramic Coating | 41 | 1 | ND | 190 | 1.0 | 2 | tr |
| Gr/Phenolic | 24 | 1 | ND | 115 | 0.5 | 1 | 1 |
| Ceramic Coating | 1 | 1 | ND | 40 | 0.5 | 1 | 1 |

*ND stands for Not Defined or Not Detected.
+tr stands for trace.

The were reclaimed and cut into ½-inch wide coupons, 3 inches long. Each specimen yielded 5 coupons which were tested in accordance with ASTM D-790, using a universal testing machine and a deflectometer in the anvil mode. A length-to-depth ratio of 16 to 1 and a span length of 2.5 inches was used for all specimens. The specimens were tested for flexural strength before and after the fire test, and original thickness, before the fire test, was used to calculate the residual flexural strength after the fire test.

The results of this flexural strength testing for the panels representing the four composite structures were averaged in Table 3 for the five coupons. In each column, the first number represents flexural strength in Ksi before the fire test, and the second number represents flexural strength after the fire test. The last number is the per cent residual strength retained after the fire test. The ceramic coating evidently provided protection against loss of flexural strength for all composite structures except the Graphite/Phenolic (Gr/Ph) panel.

Heat Release and Ignitability (ASTM E-1354)

Ignitability has been defined as the ease of ignition. The higher the heat flux, the shorter the time before ignition. Fire barriers provide the most benefit by delaying the onset of spontaneous ignition, thereby providing a greater time interval for the fire fighters to control the fire. Heat release may be defined as the heat generated in a fire due to various chemical reactions occurring within a given weight or volume of material, generally involving the generation of CO and $CO_2$ and consumption of $O_2$.

TABLE 3

| Composite/Fire Barrier | Residual Flexural Strength Ksi, ASTM D-790 | | | | | | | | | | | |
|---|---|---|---|---|---|---|---|---|---|---|---|---|
| | Gl/Ve | | | Gr/EP | | | Gr/BMI | | | Gr/PH | | |
| | Before | After | % RSR* | Before | After | % RSR | Before | After | % RSR | Before | After | % RSR |
| Control | 58.9 | 8.4 | 14 | 104 | DL+ | 0 | 115 | 18.4 | 16 | 91 | 49 | 54 |
| Ceramic Coating | 63.0 | 17.5 | 28 | 117.1 | 15.1 | 13 | 147.6 | 52.5 | 36 | 48.8 | 24.6 | 50 |

*RSR stands for Residual strength retained.
+DL stands for Delaminated.

This test method is used primarily to determine the heat evolved in, or contributed to, a fire involving products of the test material. Also included is a determination of the effective heat of combustion, mass loss rate, the time to ignition, and smoke production.

The test apparatus consisted of a conical-shaped radiant electric heater, a load cell, an exhaust gas system with oxygen monitoring, and smoke obscuration instrumentation. The tests were conducted on test specimens 4×4 inches square and approximately 0.175 in. thick in a horizontal orientation at external radiant heat fluxes of 25, 75, and 100 kW/m² with a spark pilot ignition source. The data obtained included heat release rate, heat of combustion, ignition time, and extinction coefficient.

The results in Table 4 show the percent weight loss (WL), ignition time in seconds (Tig), peak heat release rate in kW/m² (PHR), and average heat release rate in kW/m² at 60, 180, and 300 seconds after ignition at 25, 75, and 100 kW/m² radiant heat flux for the unprotected composite structures and for the same structures having the ceramic fire barrier.

Figure 5:
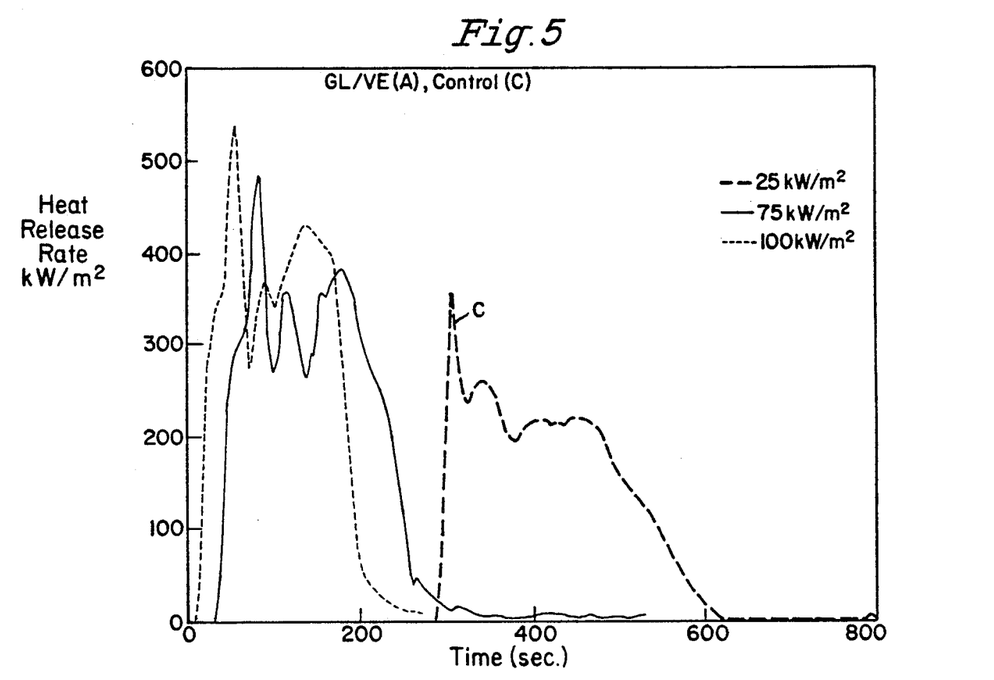
FIG. 5 shows the heat release rate for a glass/vinyl ester panel (C).
Figure 6:
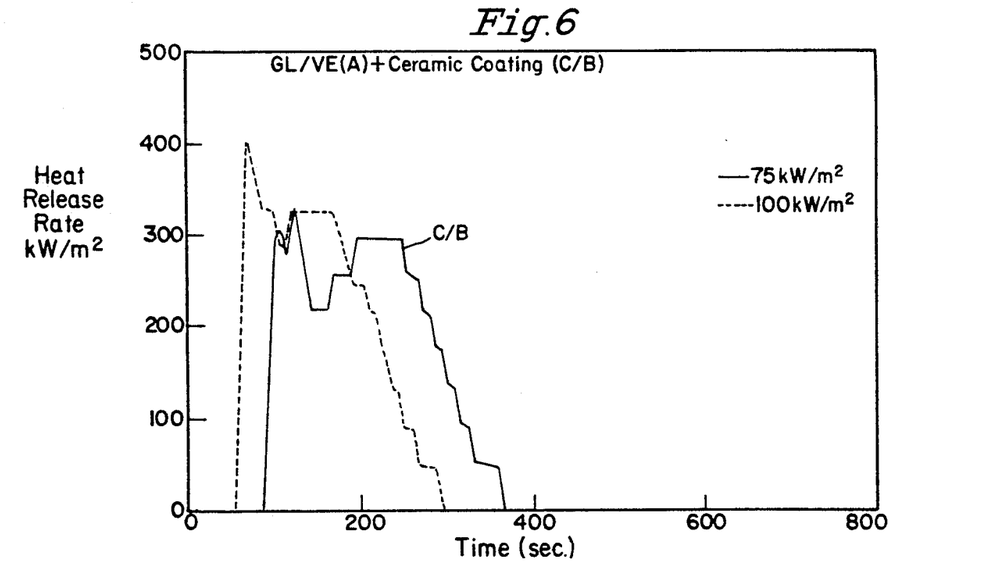
FIG. 6 shows the heat release rate for a glass/vinyl ester panel having a ceramic coating (C/B).
Figure 7:
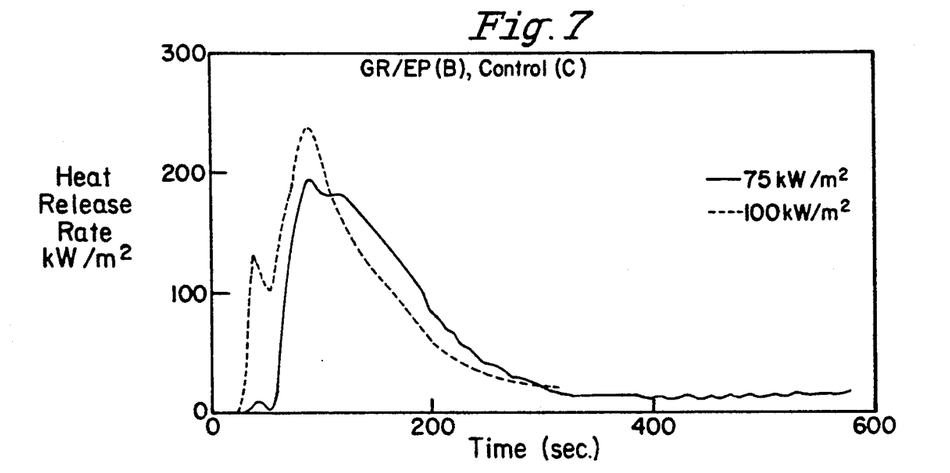
FIG. 7 shows the heat release rate for a graphite/epoxy panel (C).
Figure 8:
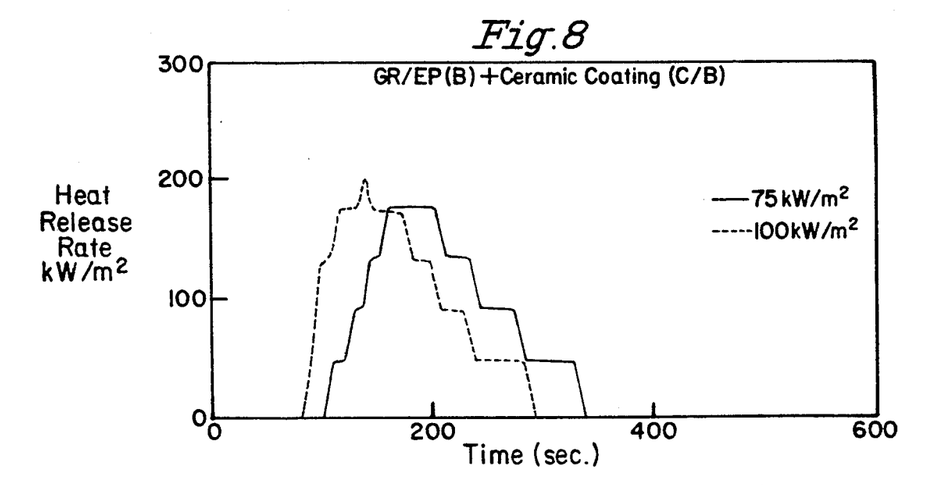
FIG. 8 shows the heat release rate for a graphite/epoxy panel having a ceramic coating (C/B).
Figure 9:
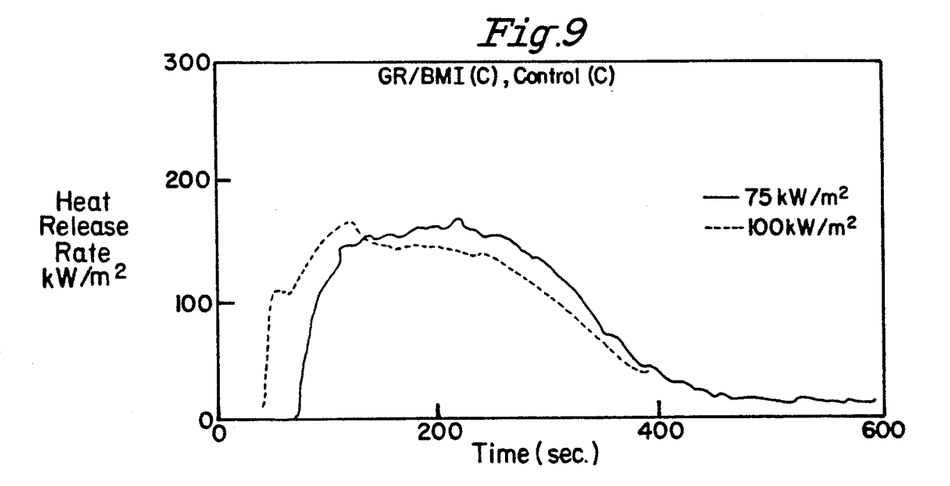
FIG. 9 shows the heat release rate for a graphite/bismaleimide panel (C).
Figure 10:
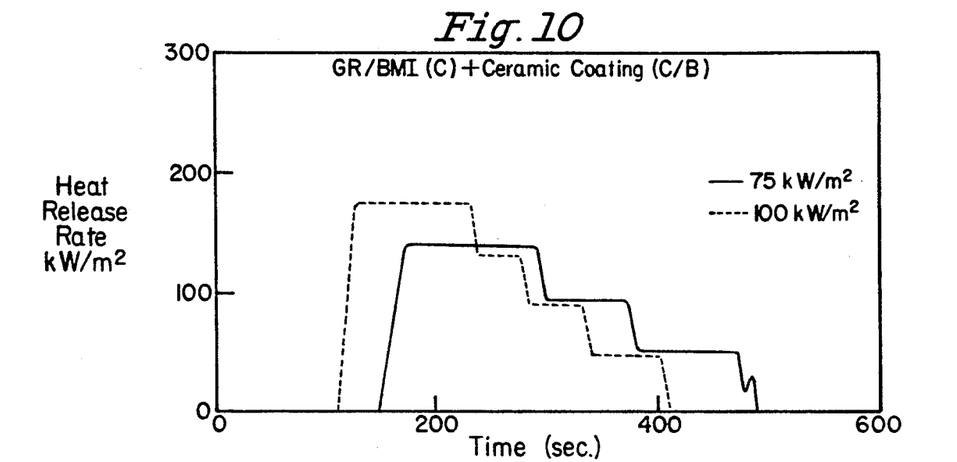
FIG. 10 shows the heat release rate for a graphite/bismaleimide panel having a ceramic coating (C/B).
Figure 11:
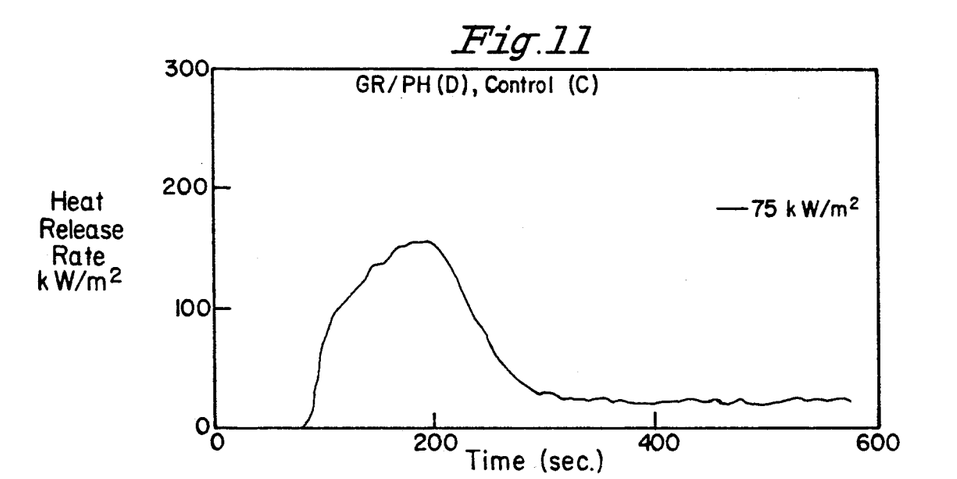
FIG. 11 shows the heat release rate for a graphite/phenolic panel (C).
Figure 12:
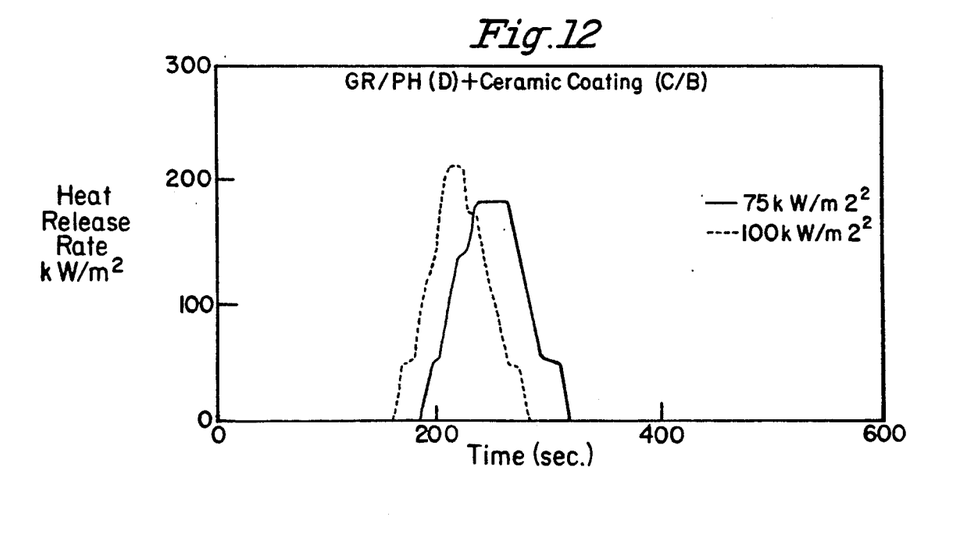
FIG. 12 shows the heat release rate for a graphite/phenolic panel having a ceramic coating (C/B).

The results of this test are shown graphically in FIGS. 5–12. The delay in the onset of heat release that is provided by the ceramic coating, as detected in the evolved gases, is clearly evident for each of the four composites by comparing the times for heat release at each comparable radiation level.

TABLE 4

Heat Release and Ignitability, ASTM E-1354

| | 25 kW/m² | | | | | | | 75 kW/m² | | | | | | | |
|---|---|---|---|---|---|---|---|---|---|---|---|---|---|---|---|
| | WL* (%) | Tig (s) | PHR | AHR 60 | 180 | 300 | Ex. A | TH | WL* (%) | Tig (s) | PHR | AHR 60 | 180 | 300 | Ex. A | TH |
| Gl/VE | | | | | | | | | | | | | | | | |
| C | 36 | 281 | 377 | 290 | 240 | 180 | 1133 | 55 | 41 | 22 | 498 | 240 | 310 | 220 | 1218 | 68 |
| C/B | 1 | NI* | 0 | 0 | 0 | 0 | 0 | 0 | 33 | 88 | 344 | 231 | 257 | 193 | 1080 | 58 |
| Gr/EP | | | | | | | | | | | | | | | | |
| C | 7 | NI | 0 | 0 | 0 | 0 | 601 | 0 | 25 | 53 | 197 | 160 | 130 | 90 | 891 | 30 |
| C/B | 4 | NI | 0 | 0 | 0 | 0 | 850 | 0 | 15 | 105 | 179 | 82 | 118 | 80 | 1080 | 24 |
| Gr/BMI | | | | | | | | | | | | | | | | |
| C | 5 | NI | 0 | 0 | 0 | 0 | 238 | 0 | 30 | 66 | 172 | 110 | 150 | 130 | 933 | 45 |
| C/B | 2 | NI | 0 | 0 | 0 | 0 | 0 | 0 | 14 | 147 | 141 | 96 | 117 | 98 | 1270 | 31 |
| Gr/PH | | | | | | | | | | | | | | | | |
| C | 4 | NI | 0 | 0 | 0 | 0 | 0 | 0 | 28 | 79 | 159 | 80 | 110 | 80 | 261 | 28 |
| C/B | 4 | NI | 0 | 0 | 0 | 0 | 30 | 0 | 16 | 185 | 184 | 71 | 82 | 49 | 460 | 15 |

| | 100 kW/m² | | | | | | |
|---|---|---|---|---|---|---|---|
| | WL* (%) | Tig (s) | PHR | AHR 60 | 180 | 300 | Ex. A | TH |
| Gl/VE | | | | | | | | |
| C | 35 | 11 | 557 | 330 | 350 | — | 1466 | 64 |
| C/B | 36 | 48 | 414 | 260 | 278 | 187 | 1140 | 56 |
| Gr/EP | | | | | | | | |
| C | 21 | 28 | 241 | 160 | 140 | — | 997 | 28 |
| C/B | 14 | 84 | 219 | 112 | 120 | 77 | 1260 | 23 |
| Gr/BMI | | | | | | | | |
| C | 31 | 37 | 168 | 130 | 150 | 130 | 971 | 41 |
| C/B | 18 | 107 | 176 | 124 | 145 | 114 | 1300 | 35 |
| Gr/PH | | | | | | | | |
| C | — | 45 | 196 | — | — | 140 | 508 | 38 |
| C/B | 14 | 124 | 216 | 127 | 78 | 47 | 520 | 14 |

*WL = Weight Loss (%); Tig = Time of ignition (seconds); PHR = Peak Heat Release, kW/m²; AHR = Average heat release, kW/m²; Ex. A = Extinction area, m²/kg; TH = Total heat release, MJ/m².
+NI = Not ignited.
−NI = Flash ignition at 10 seconds after the start of the test.

The invention may be more fully understood by consideration of the following examples.

EXAMPLE 1

A glass/vinyl ester (Gl/VE) practice panel was solvent wiped, grit blasted, wire sprayed, and plasma sprayed while being air cooled, all spraying being done on automatic X-Y traverse, according to the zinc wire spray and plasma spray parameters described with reference to the results in Tables 1–4, to deposit a duplex coating consisting of 0.005 inch of arc wire sprayed Zn as a bond coat followed by 0.007 inch of plasma sprayed $Y_2O_3$-stabilized $ZrO_2$ as a thermal barrier coat. Evaluation of these initial duplex coatings through bond strength measurements showed an average bond strength of slightly less than 500 psi.

EXAMPLE 2

Using a similar glass/vinyl ester (Gl/VE) practice panel, the same process sequences described in Example 1 for Zn spraying and yttria-stabilized zirconia spraying were employed except that the thickness of the Zn bond coat was reduced to 0.001–0.003 inch in order to improve the bond strength and the zirconia coating was also reduced slightly in thickness. Bond strength measurements Were 1734, 2152, and 1614, averaging 1833 psi.

These spraying procedures were used without alteration for duplex coating of four larger glass and carbon fiber reinforced composite panels which were tested with the results shown in Tables 1-4.

What is claimed is:

1. A fire-resistant composite structure containing an organic material and having a duplex coating on one surface as an exposed fire barrier, said organic matrix compound being selected from the group consisting of vinyl esters, epoxies bismaleimides, and phenols said duplex coating comprising a bonding and heat-diffusing metal coating attached to said on surface and a stabilized zirconia coating attached to said metal coating, said metal coating being formed of a thickness in the approximate range of 0.001–0.003 inches from a metal or metal alloy having a melting point within the approximate range of 450°–1250° F., and said stabilized zirconia coating being of a thickness in the approximate range of 0.005–0.007 inches.

2. The composite structure of claim 1, wherein said metal coating is zinc.

* * * * *